July 31, 1962 F. VAN GORP 3,046,805
WING PULLEY BELT GRIPPING DEVICE
Filed Feb. 1, 1960 2 Sheets-Sheet 1

INVENTOR
FRANKLIN VAN GORP
BY
Lavell & Henderson
ATTORNEY'S

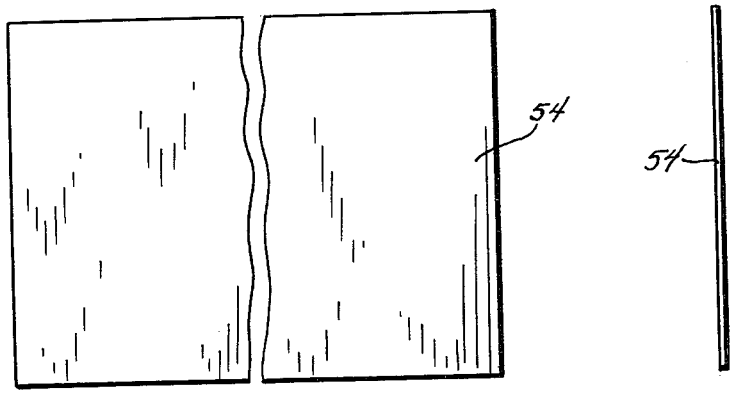
Fig. 5   Fig. 6
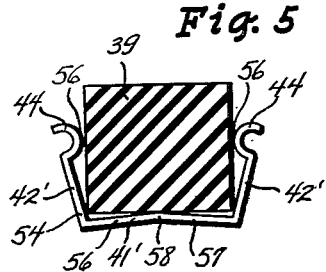 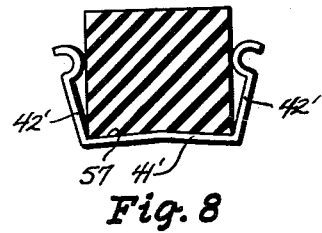
Fig. 7   Fig. 8
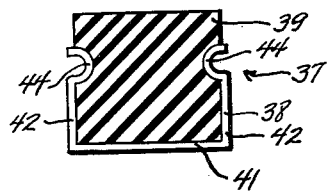
Fig. 9
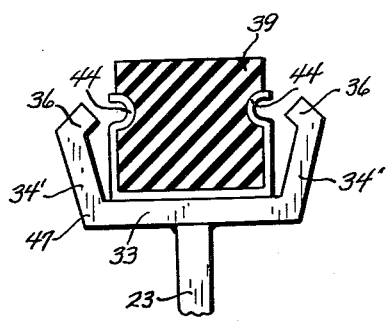 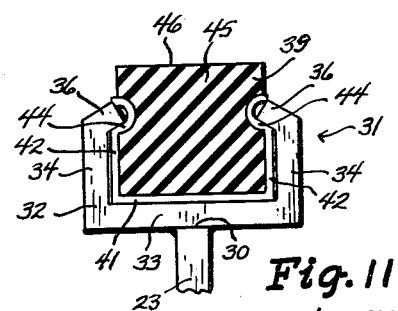
Fig. 10   Fig. 11
INVENTOR
FRANKLIN VAN GORP
BY Lowell × Henderson
ATTORNEYS

United States Patent Office 3,046,805
Patented July 31, 1962

1

3,046,805
WING PULLEY BELT GRIPPING DEVICE
Franklin Van Gorp, Pella, Iowa, assignor to Van Gorp Manufacturing, Inc., Pella, Iowa, a corporation of Iowa
Filed Feb. 1, 1960, Ser. No. 5,831
3 Claims. (Cl. 74—230.7)

This invention relates generally to pulleys for use with conveyer and elevator belts, and more particularly to an improved pulley and the method of forming the same, which pertains to a resilient lagging formed on a pulley for contacting the belt.

An object of this invention is to provide an improved pulley for use with belts, and to provide a novel method for manufacturing the improved pulley.

Another object of this invention is to provide a wing-type pulley with means engageable with a belt about the pulley for increasing the traction and positive drive of the pulley relative to driving the belt.

A further object of this invention is to provide an improved pulley with a plurality of resilient devices about the periphery thereof for frictionally engaging and driving a belt, and whereby wear of the belt by engagement with the pulley is minimized.

Yet another object of this invention is the provision of a novel and simple method of attaching resilient devices about the periphery of a wing-type pulley, which devices are adapted to engage a belt driven or guided by the pulley.

These objects, and other features and advantages of this invention will become readily apparent by reference to the following description when taken in conjunction with the accompanying drawings, wherein:

FIG. 5 is an enlarged, foreshortened plan view of a rectangular flat metal blank for being formed into a retaining member;

FIG. 6 is an end elevational view of the metal blank of FIG. 5;

FIG. 7 is an end elevational view of the metal blank, after it has been formed in the shape illustrated, and showing an end of a resilient member seated therein;

FIG. 8 is a view similar to FIG. 7 showing the relation of the parts after the resilient member has been pressed downwardly into the formed blank;

FIG. 9 is a view similar to FIG. 8, and showing in end elevation the final assembly of the metal blank and resilient member;

FIG. 10 is an end elevational view of the assembly of FIG. 9 seated in the formed bar of FIG. 4; and FIG. 11 is a fragmentary end elevational view showing the final assembly of the belt engageable device upon which this invention is predicated.

Figure 1:
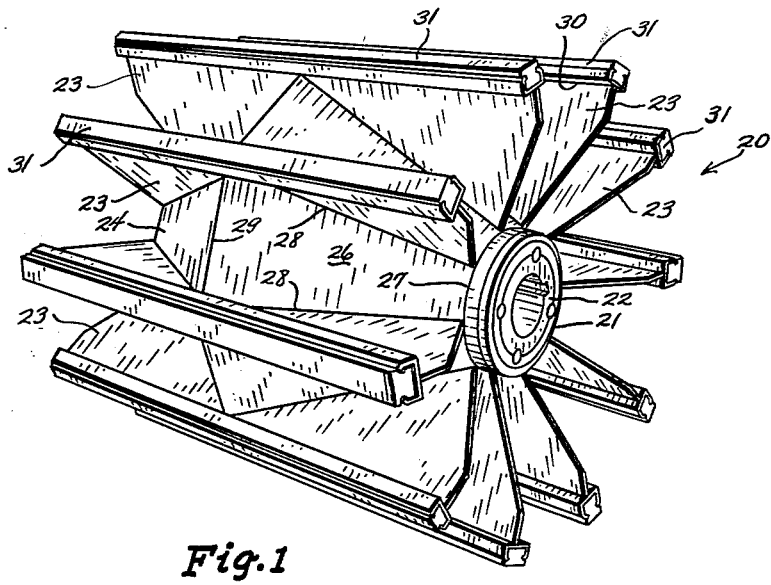
FIG. 1 is a perspective view of a wing pulley showing an embodiment of this invention applied thereto.

Referring now to the drawings, the pulley of this invention is indicated generally at 20 in FIG. 1 and is comprised of a hub 21 having bushings 22 at each end (only one showing). A plurality of flat, generally truncated plates or wings 23 are secured lengthwise along their shorter sides (not seen) to the hub 21 in a radially spaced manner. To stabilize the wings, a pair of flat truncated gusset plates 24 and 26 are provided. Each plate 24 and 26 is secured, as by welding at its narrower end 27 to

2 the hub 21 at an end thereof, and along the sides 28 of the respective plate to adjacent wings 23 in an inclined manner relative to the longitudinal axis of the hub 21. The wide ends 29 of each pair of plates 24 and 26 abut at the longitudinal center of the hub 21, as best illustrated in FIG. 1, and are secured together as by welding.

Along the outer side or face 30 of each pulley wing 23, an elongated belt gripping device 31 (FIGS. 1 and 11) is provided. As the devices 31 are identical, only one will be described with like parts indicated by like reference numerals. It should be remembered, that although the faces 30 are illustrated as being straight, they may be slightly crowned according to the practice in the pulley art.

A belt gripping device 31 (FIG. 11) includes an elongated one-piece holder 32 U-shaped in cross section and having a flat base 33 and a pair of spaced parallel side walls or legs 34 extended at right angles to the base 33. The upper edge 36 (FIG. 11) of each side wall 34 is bent inwardly from the main plane of the side wall at an inclined angle, whereby the edges are inclined toward each other.

Mounted within the holder 32 and retained particularly by the reversely inclined edges 36 is a lag unit 37 (FIG. 9) including an elongated retainer 38 and an elongated bar of resilient material, such as hard rubber, the bar termed hereinafter a lag 39. Both the retainer 38 and the lag 39 are of approximately the same length as the holder 32, and the lag 39 is substantially square in cross section. The retainer 38 is U-shaped in cross section and includes a flat base 41 and a pair of spaced, parallel side walls or legs 42 extended at right angles to the base 41.

The retainer side walls 42 terminate at their upper edges in semi-circularly formed flanges 44 (FIG. 11) the outer surfaces of which face outwardly in a concave manner relative to the lag 39. Thus, the pair of flanges 44 for each retainer face in opposite directions and form grooves into which the holder edges 36 extend. In the final assembly of the belt gripping device 31, an upper portion 45 of the lag 39 is not enclosed by the respective side walls 34 and 42, as is the remainder of the lag. This portion 45, the exposed surface 46 (FIG. 11) of which is radially extended further than the edges 36 and the flanges 44, is thus free for resilient contact with a belt, and is the only part of each device 31 which comes into contact with the belt.

Figures 2, 3:
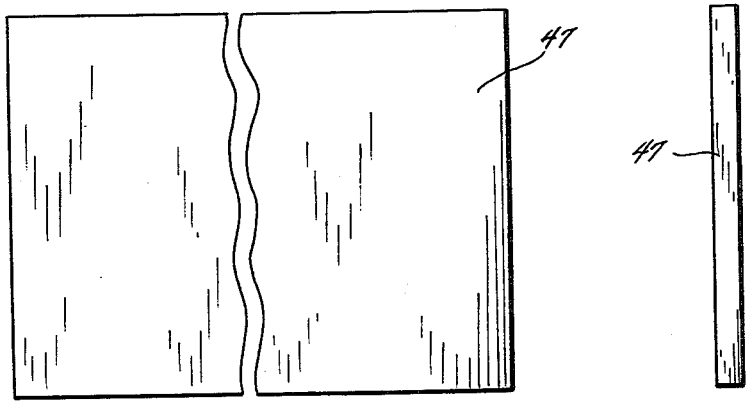
FIG. 2 is an enlarged, foreshortened plan view of a rectangular flat metal bar for being formed into a holding member.
FIG. 3 is an end elevational view of the metal bar of FIG. 2.
Figure 4:
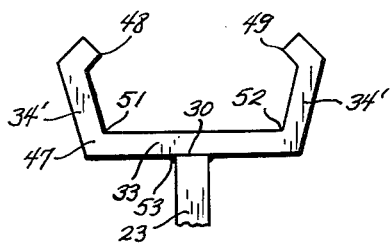
FIG. 4 is a fragmentary end elevational view of the metal bar, after it has been formed in the shape illustrated and secured to a wing of the pulley.

The method of forming each gripping device 31 is as follows. An elongated, flat bar 47 (FIGS. 2 and 3) of, for example, approximately 3/16" thickness is formed into the open U-shape in cross section, as best illustrated in FIG. 4. In this open formation, the side walls 34' are inclined outwardly from the base 33 and away from each other at an angle such that the transverse spacing or distance between the wall edges 48 and 49 (FIG. 4) is at least as great as the distance between the base side wall junction corners 51 and 52. The base 33 of the formed bar 47 is then placed on top of a wing face 30, with the face 30 being aligned longitudinally with the transverse center of the bar 47 (FIG. 4), and secured thereto by weldments 53.

An elongated, flat steel strip 54 (FIGS. 5 and 6), of 14 gauge stock, for example, is next formed in an open U-shape (FIG. 7) with a slightly crowned base 41' in cross section, so that each half 56 and 57 of the base 41' is reversely inclined relative to the other from the center 58 of the base 41'. The side walls 42' of the formed strip 54 are formed with the oppositely facing semi-circular flanges 44 at their upper edges, and are angularly inclined outwardly from each other and from the base 41'. Each side wall 42' is extended at substantially a right angle from the base half to which it is connected.

A lag 39 is then placed in the open-formed strip 54 (FIG. 7). The lag 39 is substantially square in cross section, having for example a one inch height and a one and one-eighth inch width. It is noted that the lateral spacing between the innermost surfaces 56 (FIG. 7) of the flanges 44 is sufficient to permit the lag to be seated on the base 41', and that the width of the base 41' between the side walls 42' is substantially equal to that of the lag 39.

The next step comprises pressing the lag 39 downwardly against the base 41' (FIG. 8) until its lower surface 57 assumes the crowned shape of the base 41'. Then, while the lag 39 and the formed strip 54 are held pressed together, the side walls 42' (FIG. 8) are pressed toward each other, with bending taking place primarily at the center 58 of the base 41'. As a result of this operation, the straight base 41 is formed and the inner rounded surfaces of the side wall flanges 44 are firmly embedded in and clamped to the sides of the lag 39. Thus, the retainer 38 clamps about three sides of the lag 39 providing a full line seating therefor.

After the assembly of the lag unit 37 (FIG. 9), it is placed on the base 33 (FIG. 10) of the formed bar 47 and between the outwardly inclined side walls 34'. While holding the unit 37 firmly against the base 33, the side walls 34' are forced inwardly toward each other and toward the lag unit 37 until they are at right angles to the base 33. By this operation, each side wall upper edge 36 of the holder 32 (FIG. 11) is pressed into a complementary flange 44, and with the side walls 34 and 42 clamped together. The concavely formed flanges 44 are located at a height above the base 33 wherein they are adapted to receive the inwardly turned or projecting edge 36. As best illustrated in FIG. 11, after the foregoing steps the belt gripping device 31 is assembled into a complete unit secured to a wing 23, wherein the lag 39 is securely held in place by the holder 32, and with the retainer 38 providing a protective wall therebetween. By this arrangement, there is no contact between the lag 39 and the holder 32 so as to prevent damage by the holder to the lag 39 during use of the device 31.

Although the above method of manufacturing each device 31 is preferred, it may be altered to the extent that instead of securing the formed bar 47 to the wing face 30 before the assembled lag unit 37 is inserted therein, it may be secured to the face after assembly with the unit 37. In other words, the entire belt gripping device 31 can be formed into an assembled unit prior to its securement to the wing face 30. It should also be noted that one reason for the assembly of the retainer strip 54 and lag 39 as a unit 37 (FIG. 9) is that this provides for the lag 39 being easily replaced, without removing the pulley 20. Thus, when such replacement is necessary, the holding bar side walls 34 are merely bent outwardly sufficient to remove the worn unit 37 and replace it with another, after which the side walls 34 are pressed back into their original clamping position.

In use, the pulley 20 (FIG. 1) is adapted to drive a continuous belt (not shown), with the outer surfaces 46 (FIG. 11) of the resilient lags 39, which define the periphery of the pulley 20, being the only parts of the pulley which come into contact with the belt. The resilient nature of the lags 39 provides for a positive gripping action of the pulley on the belt thereby enabling the application of more torque to the pulley. Less slippage therefore occurs which minimizes the wear of the belt. Additionally, the resiliency tends to provide a self-cleaning of particles of dust, abrasives and metal chips which tend to gather between the pulley and the belt.

The self-cleaning occurs when the belt leaves the pulley 20, whereupon the upper portion 45 of the lag 39, which has been under a twisting stress during its engagement with the belt, snaps back into normal relation with the retained remainder of the lag 39, thus cleaning the entire face 46 of the lag 39. This cleaning action is aided by the spacing between the gripping devices 31, and also by the structural arrangement of the wings 23 and the plates 24 and 26 wherein foreign matter is thrown toward the sides of the pulley. It will be appreciated that the utilization of the rubber lags 39 also diminishes attendant noise, vibrations and chattering.

Although a preferred embodiment has been disclosed herein, it is to be remembered that various modifications and alternate constructions can be made thereto without departing from the full scope of the invention, as defined in the appended claims.

I claim:

1. In a pulley for driving a flat belt and having at least one radially extended wing which has an elongated, substantially flat outer face, a belt gripping device comprising, an elongated bar of resilient material substantially square in cross section for drivingly engaging said belt, an elongated metallic retainer U-shaped in cross section and having a substantially flat base and a pair of parallel side walls terminating at their outer edges in curved flanges having concavely formed outer surfaces facing outwardly and away from each other, said retainer clamped to said bar wherein said flanges are embedded in the sides of said bar, and means holding said retainer securely to the said face of a respective wing.

2. In a pulley for driving a flat belt and having at least one radially extended wing which has an elongated, substantially flat outer face, a belt gripping device comprising, an elongated bar of resilient material substantially square in cross section for drivingly engaging said belt, an elongated metallic retainer U-shaped in cross section and having a substantially flat base and a pair of parallel side walls terminating at their outer edges in curved flanges having outer concave surfaces facing outwardly and away from each other, said retainer clamped to said bar wherein said flanges are embedded in the sides of said bar, and an elongated holding member U-shaped in cross section having a base secured to the said face of a respective wing, said holding member having side walls clamped to said retainer whereby to securely hold said retainer in place.

3. In a pulley for driving a flat belt and having at least one radially extended wing which has an elongated, substantially flat outer face, a belt gripping device comprising, an elongated bar of resilient material substantially square in cross section for drivingly engaging said belt, an elongated metallic retainer U-shaped in cross section and having a substantially flat base and a pair of parallel side walls terminating at their outer edges in curved flanges, said flanges having inner surfaces convexly formed and frictionally embedded in the sides of said bar, and an elongated holding member U-shaped in cross section and having a base and a pair of side walls each of which terminates along its free edge in an inwardly bent projection, said side wall projections facing each other and extended into said outwardly facing retainer flanges, whereby to securely hold said retainer.

References Cited in the file of this patent

UNITED STATES PATENTS

| | | |
|---|---|---|
| 486,631 | Crossley | Nov. 22, 1892 |
| 669,444 | Klitsch | Mar. 5, 1901 |
| 1,691,993 | Rogers | Nov. 20, 1928 |
| 1,731,599 | Tannewitz | Oct. 15, 1929 |
| 2,127,982 | Northup et al. | Aug. 23, 1938 |
| 2,724,893 | O'Connor et al. | Nov. 29, 1955 |